(12) United States Patent
Mayol et al.

(10) Patent No.: US 7,191,641 B2
(45) Date of Patent: Mar. 20, 2007

(54) ROTARY POSITION SENSING ASSEMBLY FOR INTERNAL COMBUSTION ENGINE

(75) Inventors: Dale Mathew Mayol, Belleville, MI (US); John Paul Vivier, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 507 days.

(21) Appl. No.: 10/278,580

(22) Filed: Oct. 24, 2002

(65) Prior Publication Data

US 2004/0079143 A1 Apr. 29, 2004

(51) Int. Cl.
*F01L 1/46* (2006.01)
*G01M 15/00* (2006.01)
*G01M 15/06* (2006.01)

(52) U.S. Cl. .................................... 73/119 R
(58) Field of Classification Search ................. 73/116, 73/866.5, 118.1, 119 R; 123/90.17, 612, 123/90.15, 414; 324/207.17, 208, 207.2, 324/207.24; 701/101
See application file for complete search history.

(56) References Cited

U.S. PATENT DOCUMENTS

| | | | |
|---|---|---|---|
| 1,516,975 A | 11/1924 | McArthur | |
| 4,213,427 A * | 7/1980 | Di Stefano | 123/43 AA |
| 4,422,323 A | 12/1983 | Linder et al. | |
| 4,653,458 A * | 3/1987 | Bergsten | 123/612 |
| 4,808,934 A * | 2/1989 | Yokoyama et al. | 324/208 |
| 4,810,967 A * | 3/1989 | Yokoyama et al. | 324/207.2 |
| 4,932,388 A * | 6/1990 | Chiba et al. | 123/613 |
| 5,239,961 A * | 8/1993 | Neidhard et al. | 123/339.25 |
| 5,271,269 A * | 12/1993 | Rilling et al. | 73/118.1 |
| 5,455,509 A * | 10/1995 | Semura et al. | 324/207.24 |
| 5,658,086 A | 8/1997 | Brokaw et al. | |
| 5,715,780 A * | 2/1998 | Haller | 123/90.17 |
| 5,757,179 A * | 5/1998 | McCurley et al. | 324/207.2 |
| 5,948,973 A * | 9/1999 | Fujii et al. | 73/116 |
| 5,998,892 A * | 12/1999 | Smith et al. | 310/68 B |
| 6,089,111 A * | 7/2000 | Machijima | 73/866.5 |
| 6,188,216 B1 * | 2/2001 | Fromer | 324/207.2 |
| 6,343,580 B2 * | 2/2002 | Uchida | 123/90.17 |
| 6,481,270 B1 * | 11/2002 | Kobayashi et al. | 73/116 |
| 6,534,970 B1 * | 3/2003 | Ely et al. | 324/207.17 |

FOREIGN PATENT DOCUMENTS

EP 1156191 A1 * 11/2001

* cited by examiner

*Primary Examiner*—Michael Cygan
*Assistant Examiner*—O. Davis
(74) *Attorney, Agent, or Firm*—Diana D. Brehob; Jerome R. Drouillard

(57) ABSTRACT

A rotary position sensing assembly for an internal combustion engine includes a mounting socket rigidly attached to a structural support of a rotating component and a position sensor slidably engaged with the socket. A slidably engageable retainer maintains the sensor within the socket at a predetermined distance from the rotating component.

22 Claims, 2 Drawing Sheets

Fig. 1
_Prior Art_
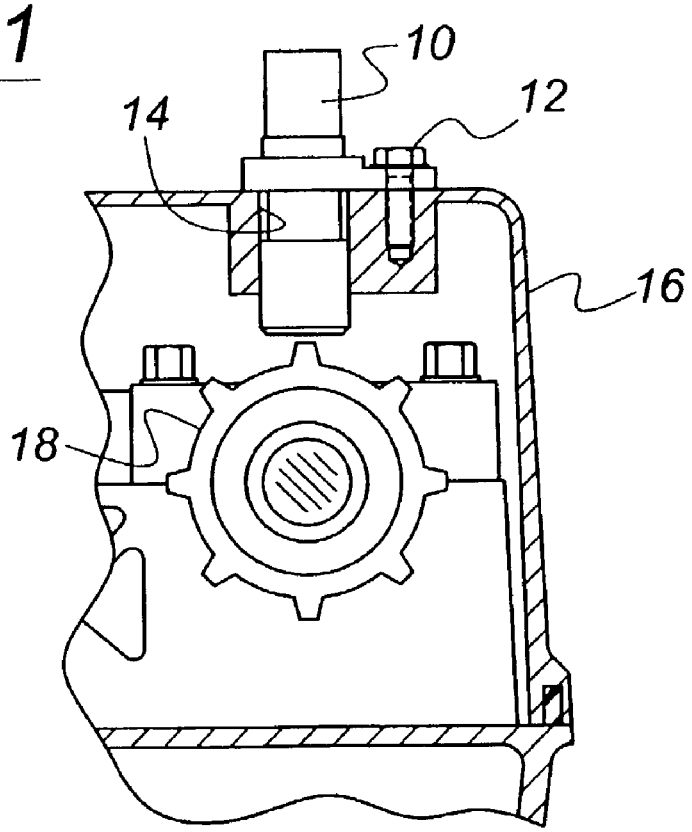

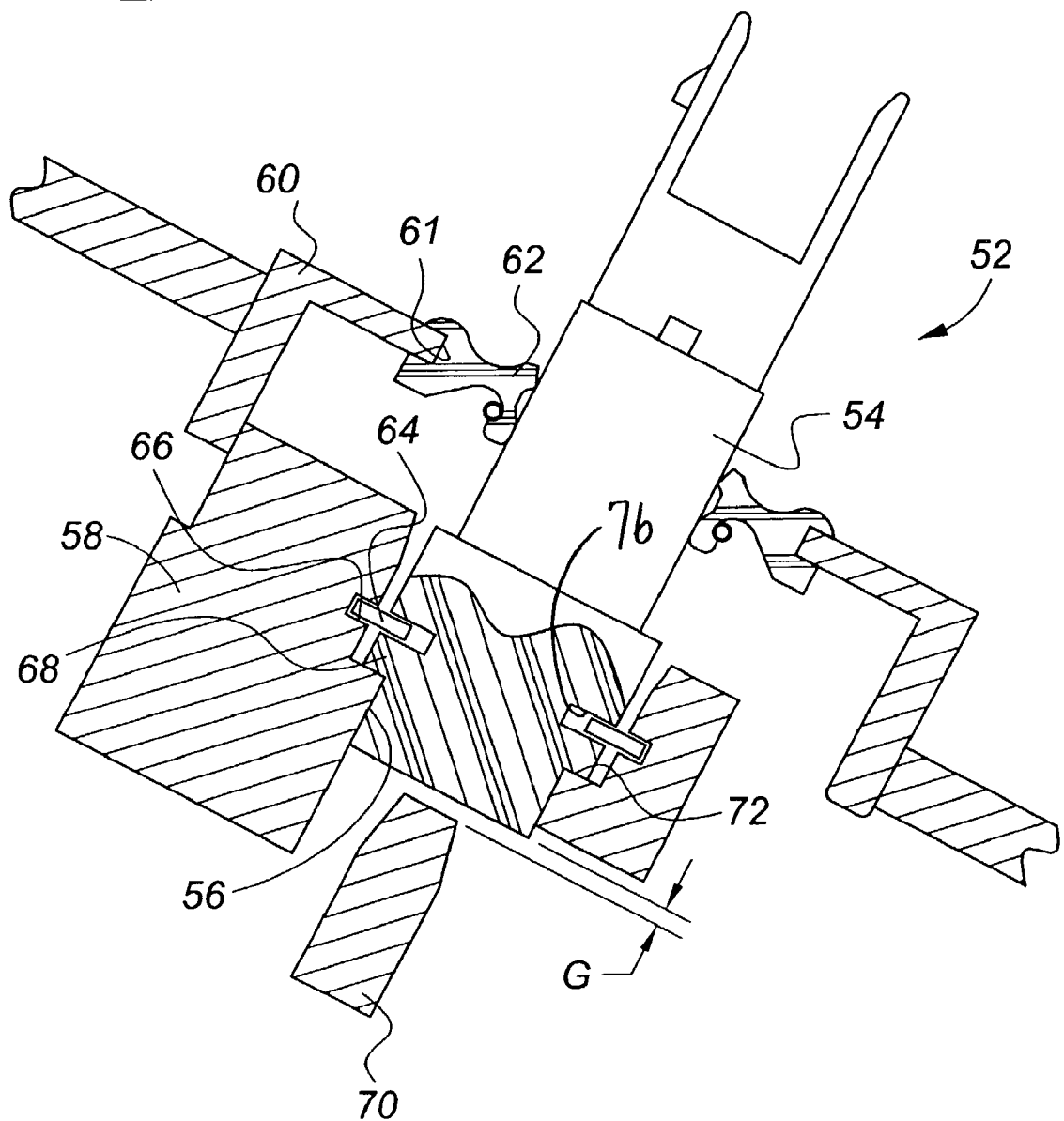

ROTARY POSITION SENSING ASSEMBLY FOR INTERNAL COMBUSTION ENGINE

BACKGROUND OF THE INVENTION

1. Field of the Invention

The present invention relates to a position sensing assembly for determining the rotating position of such engine parts as camshafts or crankshafts.

2. Disclosure Information

Electronic engine control systems have been in widespread use for a number of years in the automotive industry. The control of fuel injection and spark timing require precise information regarding the position of the engine's internal parts i.e. crankshaft, pistons, valves, etc. as the engine progresses through the usual 2 or 4-stroke cycles. The need for precise information as to the location of a camshaft is increasingly underscored by the use of such devices as variable camshaft timing. This has in turn necessitated the use of camshaft position sensors. A problem with automotive engines arises because packaging considerations do not always allow for a sensor to be mounted on the front of the engine, for example, to promote easy accessibility for service. Mounting of a camshaft sensor through a camshaft cover, as illustrated in FIG. 1, is a known attempt to provide a solution to the packaging problem.

The sensor shown at 10 in FIG. 1 is mounted and retained through camshaft cover 16 and retained within the cover by means of bolt 12. The sensor is mounted within aperture 14 formed in cam cover 16. Accurate operation of sensor 10 requires that the air gap between sensor 10 and the teeth contained on wheel 18, which is mounted to a camshaft, be accurately maintained at relatively small distance of 0.5–2.0 mm. Unfortunately, tolerance stack-up in the cam cover system, including cover 16 and any associated gasketing will impair the ability to accurately measure the position of the camshaft. This occurs because tolerance growth or other tolerance uncertainty will cause the position of sensor 10 with respect to wheel 18 to be unpredictable, and as a result the output of sensor 10 will not be reliable over long engine production runs.

The present invention solves the difficulties engendered by prior art position sensing systems, while providing a mounting system which requires only that the sensor be snapped into place by the production operator. This allows quick, error-free mounting of the sensor, while at the same time providing a seal which simultaneously prevents fluid from escaping from the engine, while preventing dirt from ingressing into the engine.

SUMMARY OF THE INVENTION

A rotary position sensing assembly for an internal combustion engine includes a mounting socket rigidly attached to a structural support of a rotating component and a position sensor slidably engaged with the socket. A slidably engageable retainer maintains the sensor within the socket at a predetermined distance from the rotating component. A structural support according to the present invention may comprise a component part of a cylinder head, a cylinder block, or other type of rigid support for a rotating component such as a crankshaft or camshaft. For example, a sensor according to the present invention may be mounted upon a camshaft tower within a cylinder head.

According to another aspect of the present invention, a position sensor may comprise a variable reluctance or Hall Effect sensor, or other type of sensor known to those skilled in the art and suggested by this disclosure. The position of the sensor within the socket is reliably, repeatably, and precisely maintained through the use of a shoulder and retainer system, wherein the mounting socket has a shoulder adapted to abuttingly receive the position sensor when the sensor is mounted within the socket and the position sensor engages and abuts the shoulder. As explained above, a retainer maintains the sensor abutted with the shoulder so as to station the sensor at a predetermined distance from a rotating component which could comprise, for example, a camshaft having a multi-tooth sensor wheel incorporated therein.

According to another aspect of the present invention, a method for installing a position sensor within a position sensing assembly for tracking the rotary position of a rotating component incorporated within an internal combustion engine includes the steps of providing a sensor mounting socket within a support structure for the rotating component, and providing a cover for the rotating component, with the cover incorporating a seal for allowing the insertion of a sensor into the mounting socket. The method further includes the step of providing an axially activated retainer adapted for interposition between the sensor mounting socket and a sensor and, finally, axially inserting a position sensor through the seal and into the retention socket until the axially activated lock engages the sensor. Positive retention and placement of the sensor are established because the sensor will abut at least a portion of the socket when the axially activated lock or retainer is engaged with the sensor.

It is an advantage of the present invention that a position sensor assembly and method according to this invention provides a speedy and error-free system for mounting a rotary position sensor.

It is another advantage of the present invention that the present mounting system and method will precisely locate a position sensor with respect to a rotating component, obviating problems associated with prior art cam cover mounting systems. The present system allows mounting of a sensor through a cam cover notwithstanding stack up changes or tolerance changes in the distance between the cam cover and a rotating component which is being monitored.

Other advantages as well as objects and features of the present invention will become apparent to the reader of this specification.

BRIEF DESCRIPTION OF THE DRAWINGS

FIG. 1 is a schematic representation of a prior art rotary position sensor used in an internal combustion engine.

FIG. 3 is a partially schematic representation of a second form of a rotary position sensing assembly according to the present invention.

DETAILED DESCRIPTION OF THE PREFERRED EMBODIMENTS

Figure 2:
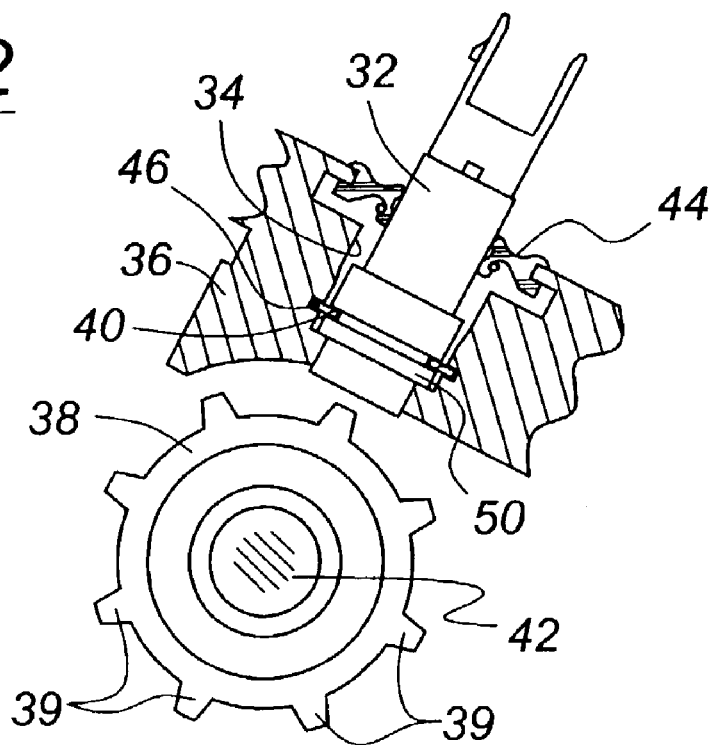
FIG. 2 is a partially schematic representation of a rotary position sensor and assembly according to the present invention.

As shown in FIG. 2, rotary position sensing assembly includes sensor 32 which may comprise either a Hall Effect or a variable reluctance sensor, or other type of sensor known to those skilled in the art and suggested by this disclosure. In any event, sensor 32 is mounted within socket 34 which is rigidly attached to cylinder block 36. In a preferred embodiment, socket 34 is formed as a bore within cylinder block 36. Socket 34 is located such that sensor 32 is in sufficient proximity with sensor wheel 38 so as to establish a 0.5–2.0 mm air gap extending between sensor 32 and the proximal end of each tooth, 39, attached to sensor wheel 38. Shaft 42 may comprise either a crankshaft, or a camshaft, or another type of rotating assembly. The assembly of FIG. 2 also includes seal 44 which is attached to an outer portion of socket 34 and which serves to retain lubricant or other engine fluid, while excluding contaminants from the interior of socket 34. Finally, the sensing assembly of FIG. 2 also includes retainer 46 which is shown with further detail as item 64 in FIG. 3, and which is housed within bore or socket 34. Retainer 46 is slidably engageable, or in other words, axially activated, because all that need be done to engage retainer 46 is to push sensor 32 into contact with abutment 40 within socket 34. Thereafter, retainer 46 serves to maintain sensor 32 abutted with abutment 40, so as to maintain the precise air gap required for proper operation of sensor 32.

The abutting relationship between the sensor and its mounting socket is shown in greater detail in FIG. 3. Retainer 64 may comprise a split, or snap ring type of retainer which engages retainer groove 66, which is formed within the wall of socket 56. Alternatively, retainer 64 may comprise a wireformed ring or other similar type of spring or snap ring type of retainer known to those skilled in the art and suggested by this disclosure.

Retainer 64 is preferably mounted upon sensor 54 prior to insertion of sensor 54. This allows sensor 54 and retainer 64 to be pushed into socket 56 until retainer 64 engages retainer groove 66. At this point sensor 54 will have been pushed into registry abutment with shoulder 72 which is formed in socket 56. This permits sensor 54 to be snapped into position within socket 56 without the need of any special tools.

FIG. 3 further illustrates the use of a sensing assembly according to the present invention in which the sensor portion, 54, of the sensing assembly is inserted through cover 60 which encloses an engine structure such as camshaft tower 58 of cylinder head 57. Sensor 54 passes through seal 62, which is mounted within aperture 61 formed in cover 60. Although seal 62 is shown as having a garter spring 74 for purposes of enhancing its sealing capability, those skilled in the art will appreciate in view of this disclosure that seal 62 could be selected from any one of a number of different types of seals known to those skilled in the art and suggested by this disclosure.

Sensor 54 is precisely located axially by the present mounting system, so as to maintain the air gap, G, required for any particular sensor being employed according to the present invention. As before, sensor 54 is intended to detect the position of a rotating assembly (not shown) which has a sensor wheel with at least one tooth 70 incorporated therein.

Sensor 54 has integral abutment 68 formed about the periphery of sensor 54. This abutment 68 abuts a shoulder 72 formed as a portion of socket 56. Thus, when abutment 68 and shoulder 72 are in contact with each other, sensor 54 is prevented from sliding any further into the engine. Moreover, retainer 64 which is mounted within retainer groove 66 formed in socket 56, and a similar groove 76 formed in the outer periphery of sensor 54, serves to prevent unwanted movement outward of sensor 54 in a direction away from sensor wheel 70. As a result, the present inventive mounting system will reliably, repeatably and precisely locate sensor 54 within socket 56, so as to maintain air gap G within a specified range.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed:

1. A rotary position sensing assembly for an internal combustion engine, comprising:
    a mounting socket rigidly attached to a structural support of a rotating component;
    a position sensor slidably engaged with said socket; and
    a slidably engageable retainer for maintaining the sensor within the socket at a predetermined distance from the rotating component.

2. A rotary position sensing assembly according to claim 1, wherein said structural support comprises a cylinder head.

3. A rotary position sensing assembly according to claim 1, wherein said structural support comprises a cylinder block.

4. A rotary position sensing assembly according to claim 2, wherein said structural support comprises a camshaft tower forming a portion of said cylinder head.

5. A rotary position sensing assembly according to claim 1, wherein said position sensor comprises a variable reluctance sensor.

6. A rotary position sensing assembly according to claim 1, wherein said position sensor comprises a Hall Effect sensor.

7. A rotary position sensing assembly according to claim 1, wherein said retainer comprises a snap ring mounted upon said sensor.

8. A rotary position sensing assembly according to claim 1, wherein said rotating component comprises a camshaft.

9. A rotary position sensing assembly according to claim 1, wherein said rotating component comprises a crankshaft.

10. A rotary position sensing assembly according to claim 1, further comprising a cover for said rotating component, and a seal mounted through said cover so as to permit passage of the sensor through the cover and into engagement with the socket and with the slidably engageable retainer.

11. A rotary position sensing assembly according to claim 1, further comprising a seal interposed between said sensor and a wall of said socket.

12. A rotary position sensing assembly for an internal combustion engine, comprising:
    an open-ended mounting socket formed within a structural support for a rotating component within the engine, with said mounting socket having a shoulder adapted to abuttingly receive a position sensor mounted within the socket;
    a position sensor engaged with said socket and abutting said shoulder; and
    a retainer for maintaining the sensor abutted with the shoulder, so as to maintain the sensor at a predetermined distance from the rotating component.

13. A rotary position sensing assembly according to claim 12, wherein said structural support comprises a camshaft support.

14. A rotary position sensing assembly according to claim 12, wherein said rotating component comprises a crankshaft.

15. A rotary position sensing assembly according to claim 12, further comprising a cover for said rotating component, and a generally annular seal mounted through said cover so as to permit passage of the sensor through the cover and into engagement with the socket.

16. A rotary position sensing assembly according to claim 15, wherein said rotating component comprises a camshaft.

17. A rotary position sensing assembly according to claim 12, wherein said position sensor comprises a variable reluctance sensor.

18. A method for installing a position sensor within a position sensing assembly for tracking the rotary position of a rotating component incorporated within an internal combustion engine, comprising the steps of:
provviding a sensor mounting socket within a support structure for a rotating component;
providing a cover for said rotating component, with said cover incorporating a seal for allowing the insertion of a sensor into said mounting socket;
providing an axially activated retainer adapted for interposition between said sensor mounting socket and a sensor; and
axially inserting a position sensor through said seal and into said retention socket until said axially activated retainer engages said sensor.

19. A method according to claim 18, wherein said rotating component comprises a camshaft.

20. A method according to claim 18, wherein said rotating component comprises a crankshaft.

21. A method according to claim 18, wherein said axially activated retainer comprises an axially loaded snap ring.

22. A method according to claim 18, wherein said sensor abuts at least a portion of the socket when said axially activated retainer is engaged with the sensor.

* * * * *